(12) United States Patent
Ruggiero

(10) Patent No.: US 8,720,690 B2
(45) Date of Patent: May 13, 2014

(54) MUSICAL PIZZA BOX

(71) Applicant: Gaetano Francesco Ruggiero, Elmira, NY (US)

(72) Inventor: Gaetano Francesco Ruggiero, Elmira, NY (US)

( * ) Notice: Subject to any disclaimer, the term of this patent is extended or adjusted under 35 U.S.C. 154(b) by 0 days.

(21) Appl. No.: 13/772,823

(22) Filed: Feb. 21, 2013

(65) Prior Publication Data
US 2014/0008265 A1    Jan. 9, 2014

Related U.S. Application Data

(60) Provisional application No. 61/669,067, filed on Jul. 7, 2012.

(51) Int. Cl.
*A45C 11/20* (2006.01)
(52) U.S. Cl.
USPC ........................................ 206/551; 206/459.1
(58) Field of Classification Search
USPC ....................... 206/551, 459.1, 457, 314, 701
See application file for complete search history.

(56) References Cited

U.S. PATENT DOCUMENTS

| | | | |
|---|---|---|---|
| 4,614,266 A * | 9/1986 | Moorhead | 206/216 |
| 5,270,686 A | 12/1993 | Martinez | |
| 5,275,285 A * | 1/1994 | Clegg | 206/449 |
| 5,294,040 A * | 3/1994 | Cohen et al. | 229/116.1 |
| 5,903,869 A | 5/1999 | Jacobson et al. | |
| 5,992,629 A | 11/1999 | Gullord et al. | |
| 6,045,038 A * | 4/2000 | Smith et al. | 229/167 |
| 6,273,332 B1 * | 8/2001 | Todjar-Hengami | 229/129.1 |
| 6,305,547 B1 | 10/2001 | Curran | |
| 6,347,706 B1 | 2/2002 | D'Ambrosio | |
| 7,752,783 B2 * | 7/2010 | Chen | 40/124.03 |
| 2004/0089582 A1 | 5/2004 | Hendrix | |
| 2007/0267471 A1* | 11/2007 | Falana | 229/240 |
| 2009/0134209 A1* | 5/2009 | Tonaltzin | 229/116.1 |
| 2010/0025267 A1 | 2/2010 | Brand | |
| 2010/0089985 A1* | 4/2010 | Fusaro | 229/68.1 |
| 2011/0210160 A1 | 9/2011 | Vantieghem | |

\* cited by examiner

*Primary Examiner* — Jacob K Ackun
(74) *Attorney, Agent, or Firm* — Brown & Michaels, PC

(57) ABSTRACT

A musical pizza box includes a box material foldable into a pizza box having a lid hingedly attached to a base and a pizza box audio module. The pizza box audio module preferably includes a speaker, a microchip board capable of receiving a microchip mounted on the microchip board, at least one power source, electrical wiring electrically connecting the speaker, the microchip board, and the power source, and an activation mechanism. When the box material is folded to form the pizza box, the microchip is mounted to the microchip board, and the lid is moved from a closed state to an opened state, the activation mechanism is triggered to cause any recorded audio message stored on the microchip to be emitted by the speaker. Methods of manufacturing a musical pizza box and methods of advertising are also disclosed.

20 Claims, 8 Drawing Sheets

PRIOR ART

PRIOR ART

MUSICAL PIZZA BOX

REFERENCE TO RELATED APPLICATIONS

This application claims one or more inventions which were disclosed in Provisional Application No. 61/669,067, filed Jul. 7, 2012, entitled "MUSICAL PIZZA BOX". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the fields of advertising and packaging. More particularly, the invention pertains to packaging including audio messages.

2. Description of Related Art

Carry-out or delivery pizza is a popular consumer food product and is often served at parties or small gatherings. Carry-out or delivery pizza is also especially popular in association with particular events, such as birthdays and sporting events, especially the Super Bowl® football game each year.

Carry-out or delivery pizza is conventionally transported in a pizza box. Pizza boxes are conventionally made of corrugated cardboard. Although numerous different designs are known in the art, FIG. 1 shows a common basic conventional pizza box 10 prior to being folded. Dashed lines represent fold lines to form a folded pizza box. Two side flaps 14 and a front flap 16 extend from the lid 12. The lid 12 is separated from the bottom 18 by a back wall 17. Two side walls 20 and a front wall, which is formed by an inner front wall 22 and an outer front wall 24 when the pizza box is folded, extend from the bottom 18. Tabs 28 on the back ends of the side walls 20 insert in front of the back wall 17 and tabs 26 on the front ends of the side walls 20 insert between the front walls 22, 24 in forming the folded pizza box.

FIG. 2 shows the pizza box 10 of FIG. 1 in a folded, opened state with the lid open. FIG. 3 shows the pizza box 10 in a folded, closed state with the lid closed. In addition to the basic features shown in FIG. 1 through FIG. 3, pizza boxes may have additional holes, flaps, or tabs to make the pizza box sturdier, easier to open or close, or better at housing the pizza during transportation of the pizza from the pizza restaurant to the home of the consumer.

Pizza boxes are also often conventionally used to display advertisements directed to the consumer of the pizza, either by directly printing the advertisement on the box, or by attaching a paper flyer advertisement to the box. Often, this advertising is ignored, with the message not getting to the pizza purchaser or consumer.

Greeting card music modules are conventionally placed in greeting cards to output recorded audio when the greeting card is open. The recorded audio is conventionally prerecorded and conventionally includes music or part of a song, although recordable greeting cards are also available such that the buyer can record their own audio message on the music module prior to giving the greeting card to the intended recipient.

FIG. 4 shows schematically a prior art pre-recorded greeting card music module 30. The module 30 includes a backing 32, a microchip board 34 mounted on the backing 32, at least one power source 36, wiring 38, a speaker 40, and an activation mechanism 42. The power source 36 is preferably one or more button batteries. The power source 36 provides power to the microchip board 34 and to the speaker 40 by way of the wiring 38. The activation mechanism 42 in FIG. 4 is mechanical. The activation mechanism 42 includes a tab, which, when pulled away from the microchip board 34, allows the electrical circuit to be closed, thereby activating the audio recorded on the microchip board 34 to be outputted by the speaker 40.

FIG. 5 shows schematically a prior art recordable greeting card audio module 50. In addition to the elements of a pre-recorded greeting card music module, the recordable greeting card audio module 50 also includes a microphone 52, at least one record button 54, a replay button 56, and a key 58. To record audio on the audio module, the user first removes the key 58, which is typically made of clear plastic and inserted under a latch or one of the batteries, to begin. The user then presses and holds down the record button 54 and any produced audio is received by the microphone 52 and recorded on the microchip of the microchip board 34. The recordable greeting card audio module 50 has two record buttons 54, which must be simultaneously pressed to begin recording, although the recordable greeting card audio module 50 may alternatively only have a single record button. In some designs, the recordable greeting card audio module includes a visual or auditory signal indicating when the maximum recording time has been reached. The user may then replay the audio recording by activating a replay button 58, when present, or by engaging the activation mechanism 42. The activation mechanism 42 in FIG. 5 is mechanical. Additional wiring 38 provides electrical communication between the microphone 52, the record buttons 54, the replay button 56, and the other electronics of the device.

FIG. 6 shows a prior art light-activated greeting card music module 60. Instead of a mechanical activation mechanism, the module 60 is activated when the light sensor 62 attached to the microchip board 34 is exposed to light. The light sensor conducts electricity only when exposed to sufficient light, which allows the electrical circuit to be closed, thereby activating the audio recorded on the microchip to be outputted by the speaker 40.

SUMMARY OF THE INVENTION

A musical pizza box includes a box material foldable into a pizza box having a lid hingedly attached to a base; and a pizza box audio module. The pizza box audio module preferably includes a speaker, a microchip board capable of receiving a microchip mounted on the microchip board, at least one power source, electrical wiring electrically connecting the speaker, the microchip board, and the power source, and an activation mechanism. When the box material is folded to form the pizza box, the microchip is mounted to the microchip board, and the lid is moved from a closed state to an opened state, the activation mechanism is triggered to cause any recorded audio message stored on the microchip to be emitted by the speaker. Methods of manufacturing a musical pizza box and methods of advertising are also disclosed.

DETAILED DESCRIPTION OF THE INVENTION

Figure 1:
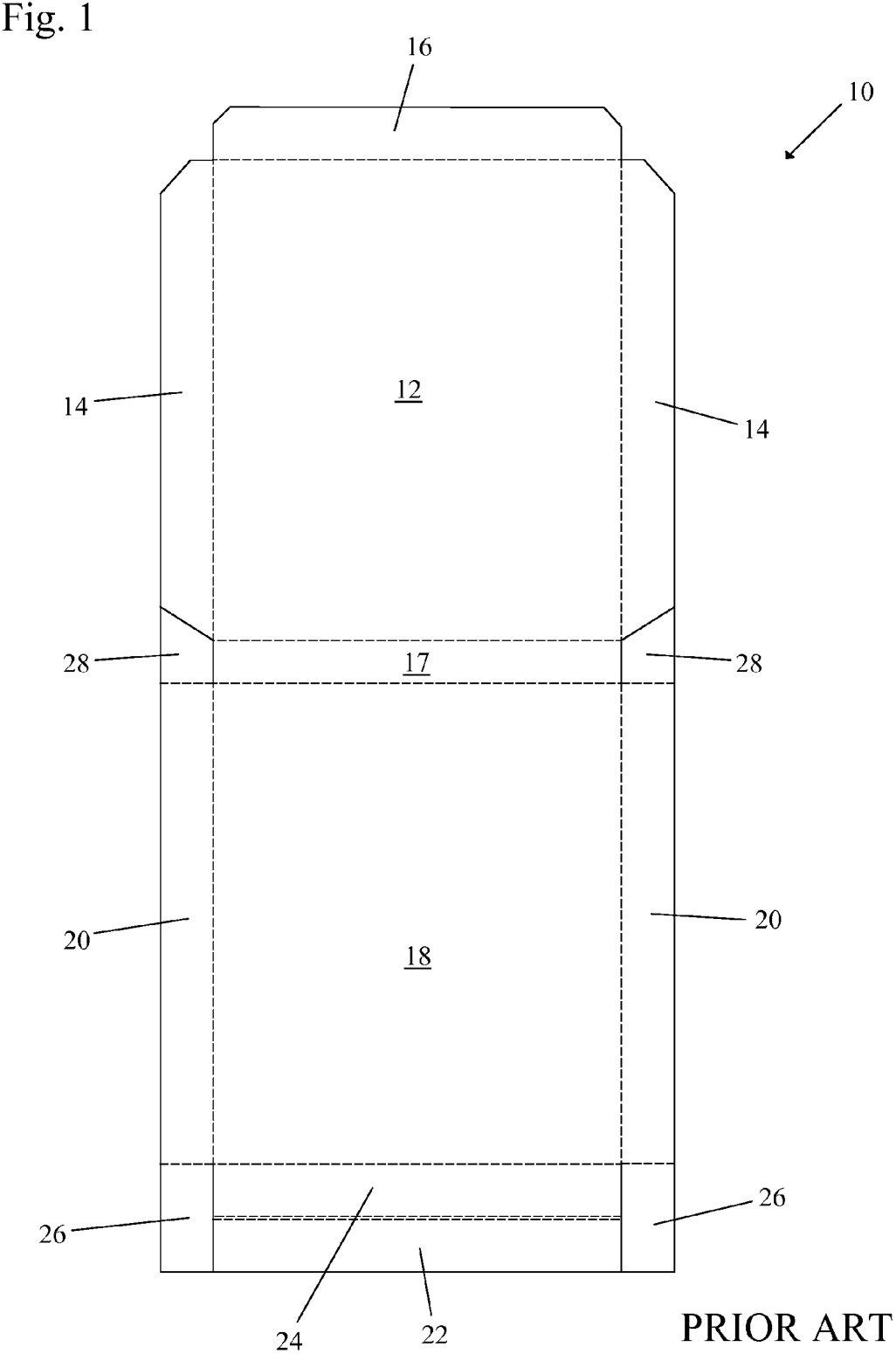
FIG. 1 shows a prior art pizza box prior to being folded.
Figure 2:
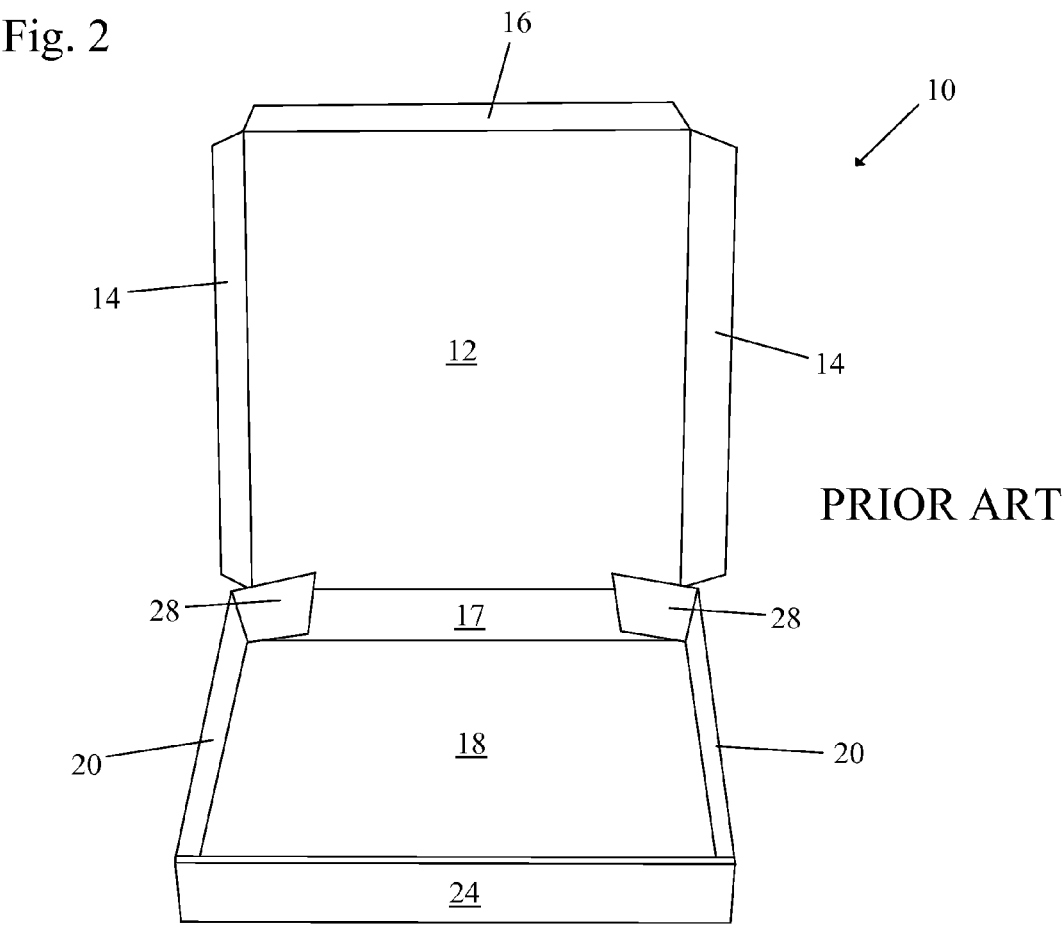
FIG. 2 shows the prior art pizza box of FIG. 1 in a folded, opened state.
Figure 3:
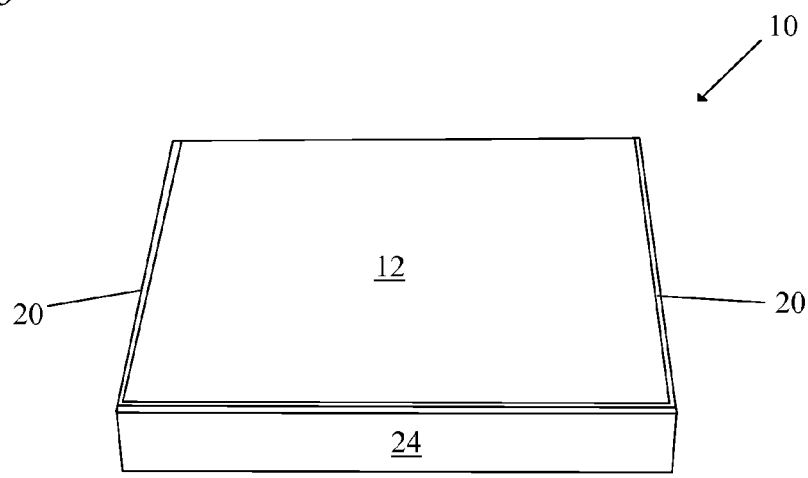
FIG. 3 shows the prior art pizza box of FIG. 1 in a folded, closed state.
Figure 4:
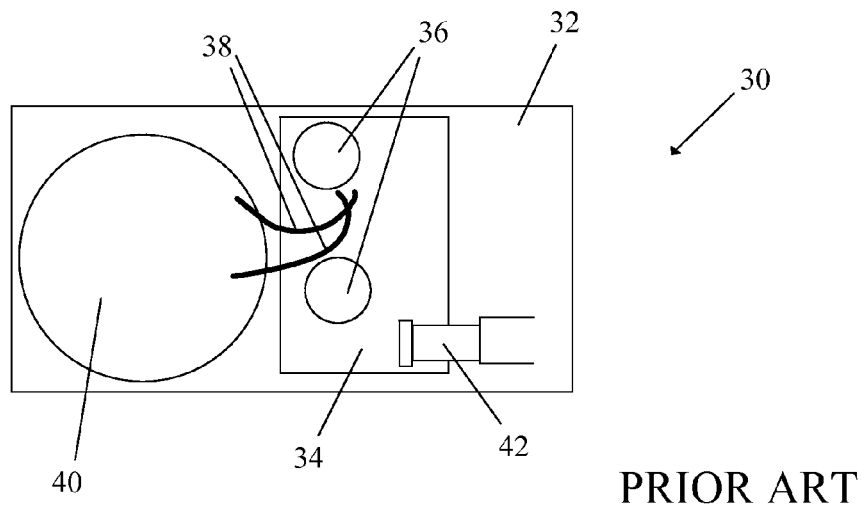
FIG. 4 shows schematically a prior art pre-recorded greeting card music module.

Pizza boxes are brought into millions of homes and businesses throughout the year, often for special occasions. A pizza box provides the opportunity to deliver advertisements, marketing materials, or simply a message or special greeting to consumers of carry-out or delivery pizza. When the customer purchases the pizza and opens the pizza box, they are treated to music or a greeting, which may include a personalized message to the customer, such as "Happy Birthday" or the like. The opening of the box preferably engages the sound-producing device to play the desired message or greeting. The sound-producing device may be activated, for example, by a photo sensor or a box hinge opening detection mechanism. The sound-producing device is referred to herein as an audio module.

A musical pizza box includes an audio module that is activated to play recorded audio when the pizza box is opened by lifting the lid of the pizza box. The audio module is preferably de-activated when the pizza box is closed and re-activated each time the pizza box is opened, as long as the battery or batteries hold sufficient charge. In some embodiments, the audio is pre-recorded prior to installation of the audio module on the pizza box. In other embodiments, the audio module is recordable and the audio is recorded after the musical pizza box has been assembled. The recorded audio may be any recorded audio, including, but not limited to, any pre-recorded song or music, which may be for a specific purpose or occasion, a pre-recorded advertisement, which may be for an event, a company, including the pizza restaurant itself, a consumer product, or custom recorded audio recorded by the pizza restaurant or a buyer or consumer of the pizza.

In some embodiments, the audio is a combination of a pre-recorded message and an optional customizable message. In some such embodiments, the pizza chain has a pre-recorded message recorded on the audio modules installed in the pizza boxes. When the pizza boxes are delivered to a local franchisee, the local franchisee may add their own recorded message or even personalize the message for the particular customer.

In one embodiment, the recorded audio is all or part of the theme to the Monday Night Football® game television broadcast. In another embodiment, the recorded audio is all or part of the song "Happy Birthday". In another embodiment, the recorded audio is all or part of the song "Thank You for Being a Friend".

Although the musical pizza box costs more than a conventional pizza box to manufacture, the audio module preferably adds less than a dollar per unit to the cost of the pizza boxes. In some embodiments, the pizza restaurant absorbs the additional cost. In other embodiments, the advertiser absorbs the additional cost. In yet other embodiments, the additional cost is passed on to the consumer, especially in the case of a recordable audio module for the consumer to record their own custom audio.

The pizza box audio module may be any kind of audio module applied in any manner to a pizza box such that the audio module is activated to play recorded audio when the pizza box is opened by lifting the lid of the pizza box.

In some embodiments, the pizza box audio module is mounted to the inside bottom surface of the pizza box. In other embodiments, the pizza box audio module is mounted to the inside top surface of the lid. In some embodiments, the pizza box audio module is mounted to the inside back surface of the pizza box. In other embodiments, the pizza box audio module is mounted to an outside surface of the pizza box. In yet other embodiments, the pizza box audio module is mounted between the layers of the corrugated cardboard.

Figure 7:
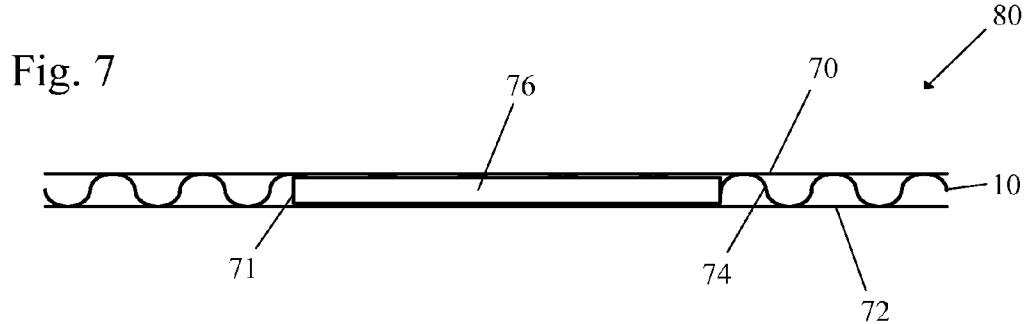
FIG. 7 shows a side view of a portion of a pizza box with an audio module between outer layers of the corrugated cardboard.

FIG. 7 shows a pocket 71 formed between the two outer layers 70, 72 of the corrugated cardboard of the pizza box 10 by removing only some of the corrugated layer 74. The audio module 76 is then inserted into the pocket 71 to form the musical pizza box 80. An adhesive may be used to maintain the module 76 in the pocket 71.

Figure 8:
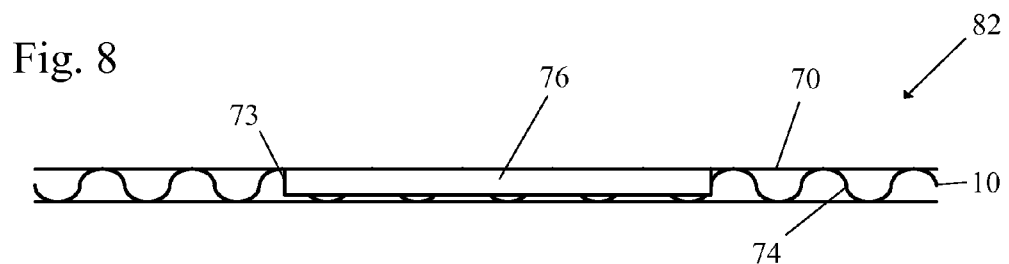
FIG. 8 shows a side view of a portion of a pizza box with an audio module embedded into the corrugated cardboard from the top.

FIG. 8 shows a recess 73 formed by removing part of the top layer 70 and the top part of the corrugated layer 74. The audio module 76 is then inserted from above into the recess 73 to form the musical pizza box 82. An adhesive may be used to maintain the module 76 in the recess 73.

Figure 9:
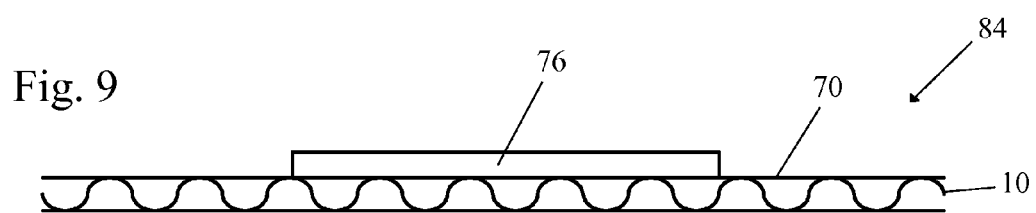
FIG. 9 shows a side view of a portion of a pizza box with an audio module attached to an outside surface of the corrugated cardboard.

FIG. 9 shows the audio module 76 attached to the outer surface of the top layer 70 of the pizza box 10 to form the musical pizza box 84. An adhesive may be used to attach the module 76 to the top layer 70.

Figure 10:
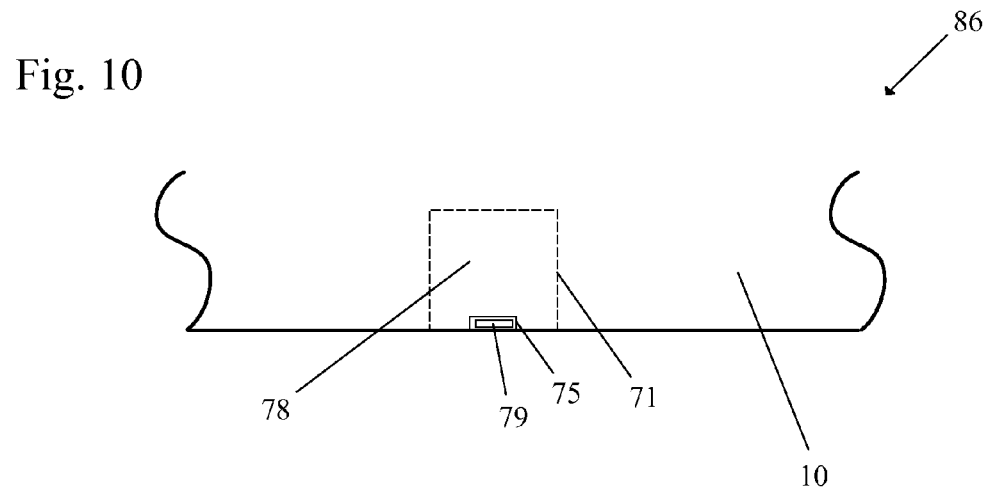
FIG. 10 shows a top view of a portion of a pizza box with a light-activated audio module between outer layers of the corrugated cardboard.

FIG. 10 shows a top view of a light-activated audio module 78 inserted into a pocket 71 in the pizza box 10 to form the musical pizza box 86. Although the audio module 78 is preferably fully inserted into the pocket 71, preferably flush with an edge or a fold of the pizza box 10 as shown in FIG. 10, the light sensor 79 is exposed by removing a small portion of the top layer of the cardboard above where the light sensor 79 is located to form a window 75 to permit light to reach the light sensor 79 when the pizza box 10 is in an opened state.

Figure 11:
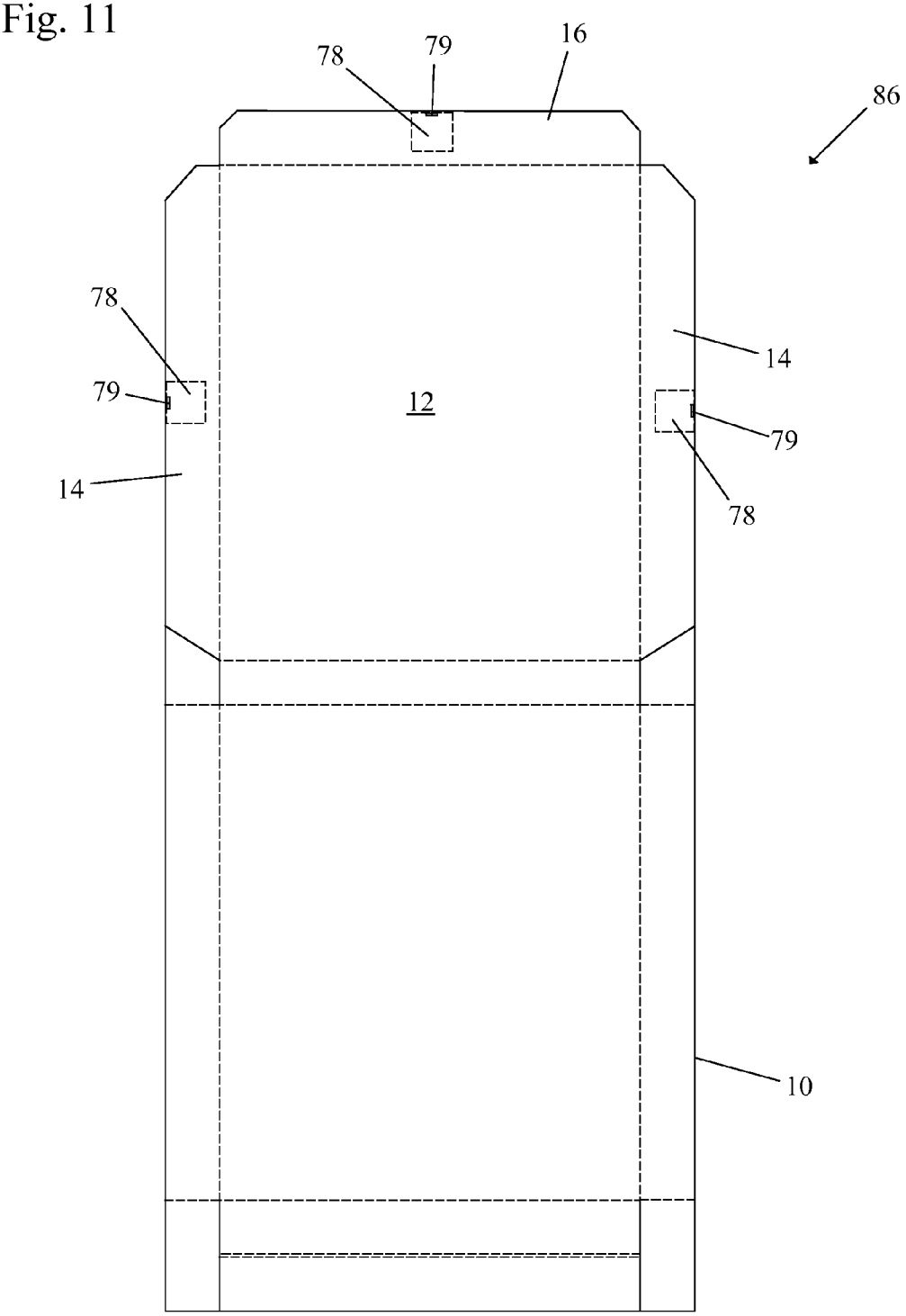
FIG. 11 shows preferred locations for a light-activated audio module on a pizza box.

When the audio module is light-activated, the light-activated audio module may be mounted on any surface that is inside the pizza box when the pizza box is closed but visible when the pizza box is open. FIG. 11 shows three preferred locations for a light-activated audio module 78. The light-activated audio module 78 is most preferably mounted to face inward on the end of the front flap 16 of the lid 12, as shown in FIG. 11. Alternatively, the light-activated audio module 78 is preferably mounted to face inward on the end of the left or right side flap 14 of the lid 12.

Figure 12:
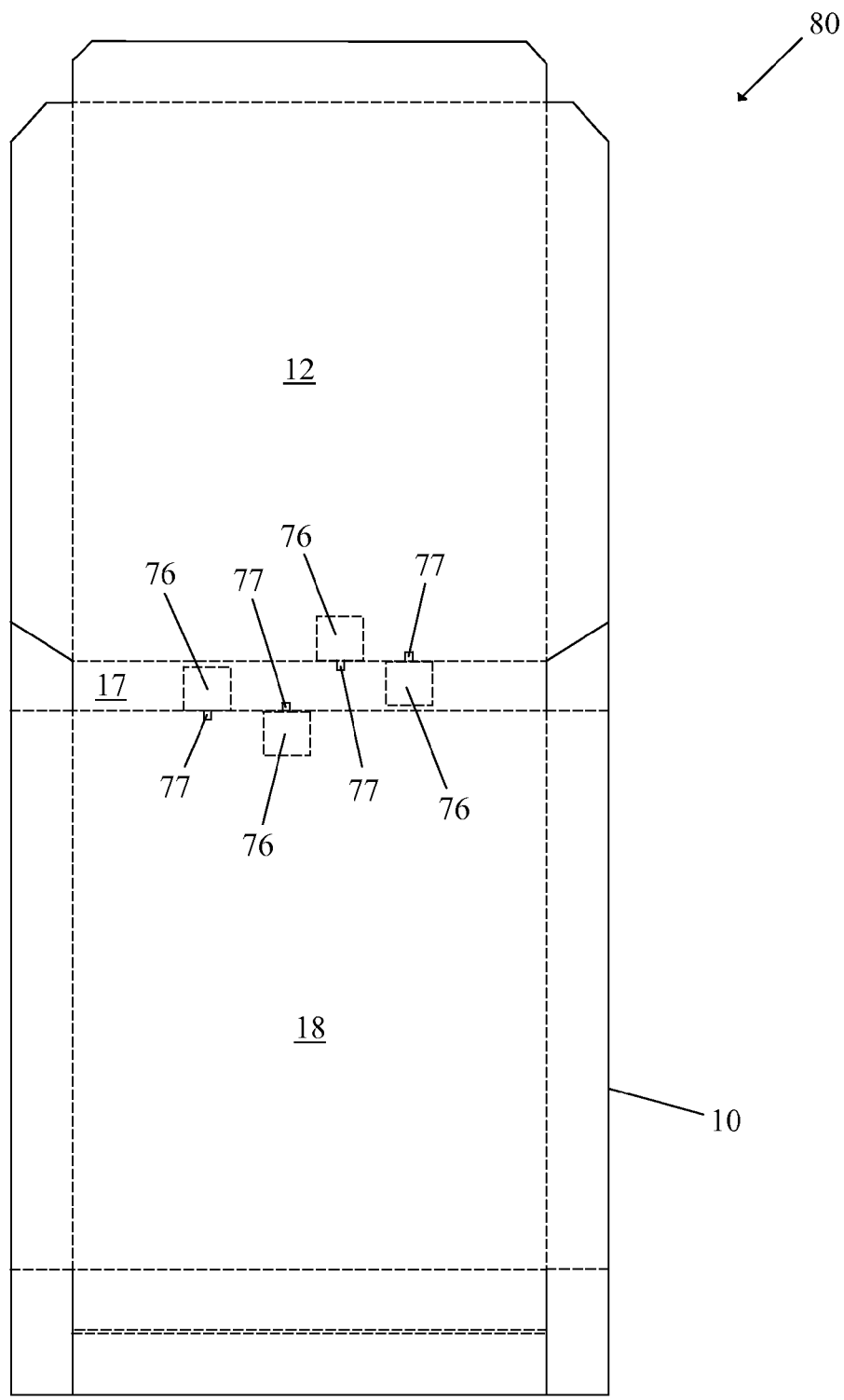
FIG. 12 shows preferred locations for a mechanically-activated audio module on a pizza box.

When the audio module is mechanically-activated, the mechanically-activated audio module is preferably mounted along a fold line of the back wall 17 of the pizza box 10, as these are the two folds that move when the pizza box is opened. The mechanically-activated audio module 76 may be mounted in a pocket, in a recess, or to an outer surface, as shown in FIG. 7 through FIG. 9. The tab 77 may be attached to an inside surface of the pizza box 10 or an outside surface. The tab 77 of the mechanically-activated audio module 76 is preferably attached to a different surface than where the main portion of the mechanically-activated audio module 76 is located, as shown in FIG. 12. FIG. 12 shows four different preferred locations for the mechanically-activated audio module 76. In one location, the mechanically-activated audio module 76 is mounted on or in the back wall 17 of the pizza box 10 with the tab 77 mounted to the lid 12 of the pizza box 10. In another location, the mechanically-activated audio module 76 is mounted on or in the back wall 17 of the pizza box 10 with the tab 77 mounted to the bottom 18 of the pizza box 10. In another location, the mechanically-activated audio module 76 is mounted on or in the lid 12 of the pizza box 10 with the tab 77 mounted to the back wall 17 of the pizza box 10. In yet another location, the mechanically-activated audio module 76 is mounted on or in the bottom 18 of the pizza box 10 with the tab 77 mounted to the back wall 17 of the pizza box 10.

Figure 13:
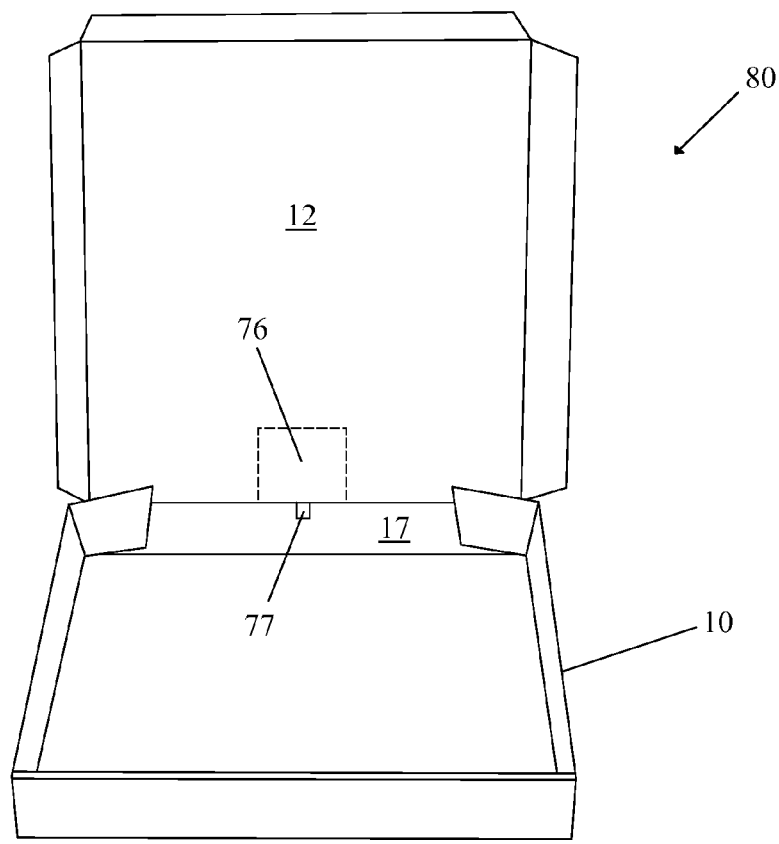
FIG. 13 shows a preferred location for a mechanically-activated audio module fully installed on a folded pizza box.

FIG. 13 shows the mechanically-activated audio module 76 fully installed at a preferred location on a folded pizza box. The adhesive cover on the tab 77 has been removed and the adhesive strip on the tab 77 has been attached to the back wall 17 of the pizza box 10 such that when the pizza box goes from a closed state to an open state by opening the lid 12, the tab 77 physically moves from an inactive position to an activated position to activate the audio module 76 to emit the pre-recorded audio. Depending on the mounting location of the audio module 76, the tab 77 extends in going from the inactive position to the activated position and retracts in going from the activated position to the inactive position in some embodiments, such as when the tab 77 is attached to the inside of the back wall 17 in the position of FIG. 13. In other embodiments, the tab 77 retracts in going from the inactive position to the activated position and extends in going from the activated position to the inactive position in some embodiments, such as when the tab 77 is attached to the outside of the back wall in the position of FIG. 13.

In some embodiments, the pizza box audio module is a conventional greeting card music module. In other embodiments, the pizza box audio module is specifically designed for application to a pizza box. The audio module preferably includes a housing surrounding the electronics to prevent them from being damaged by the environment after installation into a pizza box. In some embodiments, the audio is pre-recorded and can not be changed. In other embodiments, the audio is recordable only once. In yet other embodiments, the audio is recordable and re-recordable.

Figure 14:
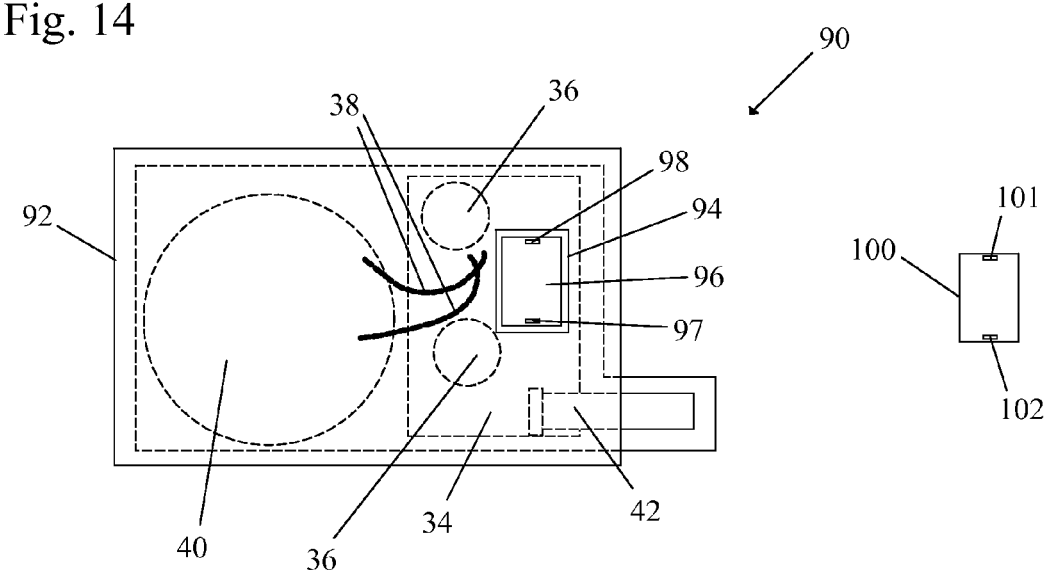
FIG. 14 shows schematically an audio module with an insertable microchip module in an embodiment of the present invention.

FIG. 14 shows a pizza box audio module 90 configured to receive a microchip 100 with the pre-recorded audio. The audio module 90 includes a housing 92 covering most of the electronics, but the housing 92 includes a window 94 to provide access to a mounting location 96 on the microchip board 34 for the microchip 100. The microchip 100 snaps into the mounting location 96 such that the electrical leads 101, 102 on the microchip 100 are in contact with the electrical leads 97, 98 of the mounting location 96 on the mounting board 34. Although the audio module is shown as a mechanically-activated audio module in FIG. 14, the audio module 90 may alternatively be a light-activated audio module. This audio module design allows the audio module to be mounted to the pizza box prior to being sent to the pizza restaurant, such as at the manufacture location of the pizza box, while still allowing the pizza shop to insert customized pre-recorded audio for the musical pizza box.

Figure 5:
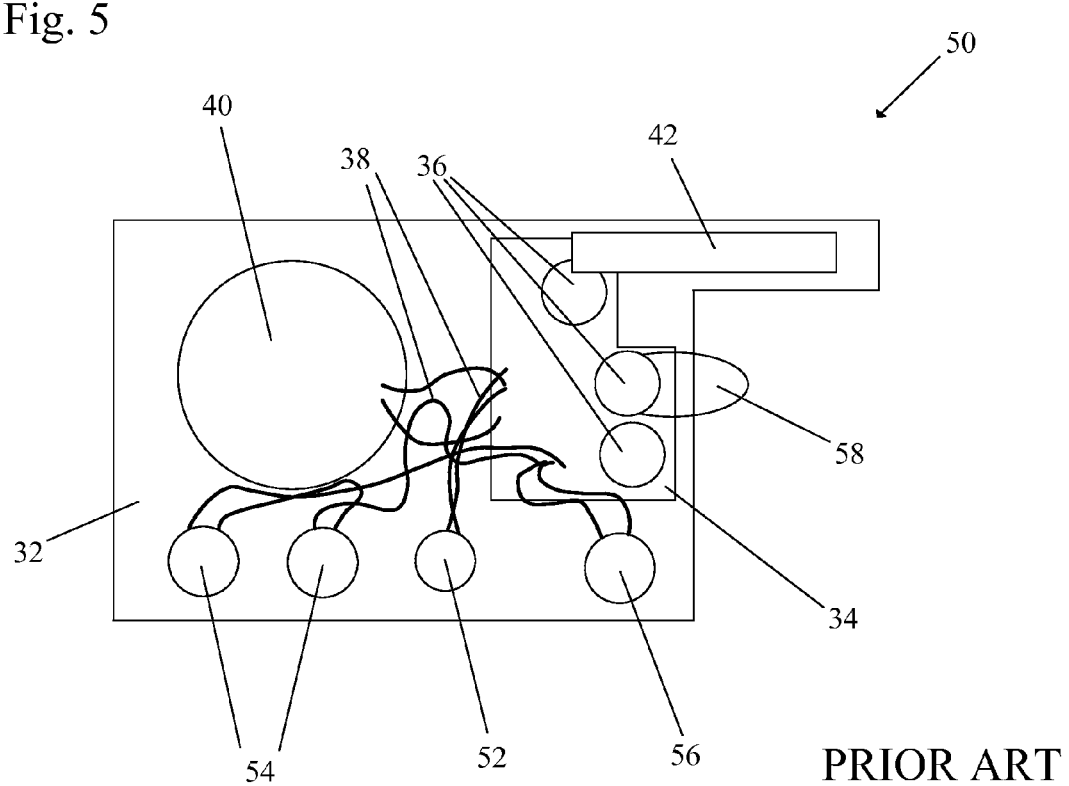
FIG. 5 shows schematically a prior art recordable greeting card music module.
Figure 6:
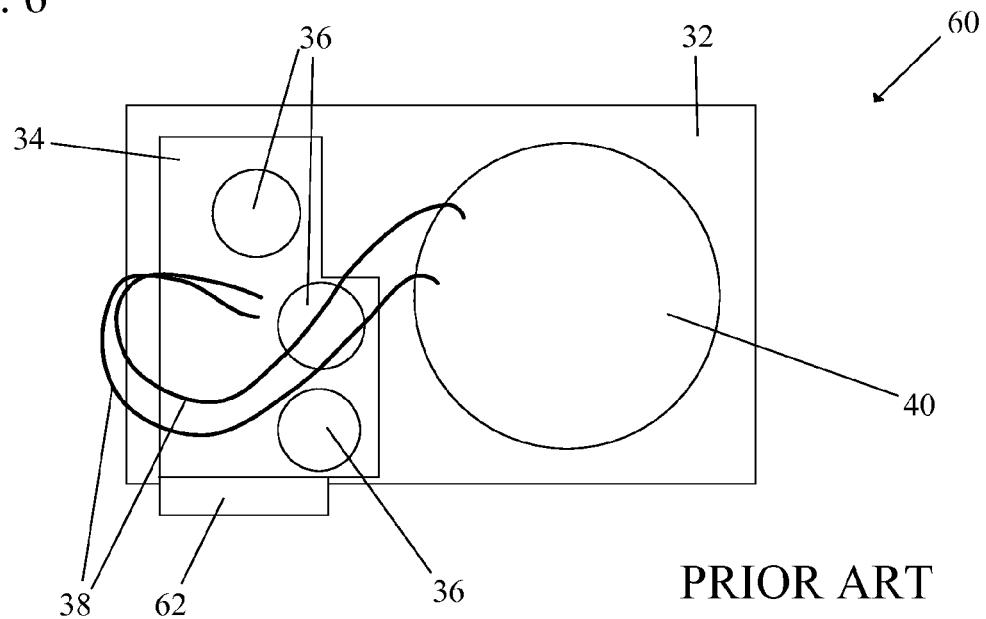
FIG. 6 shows schematically a prior art light-activated greeting card music module.
Figure 15:
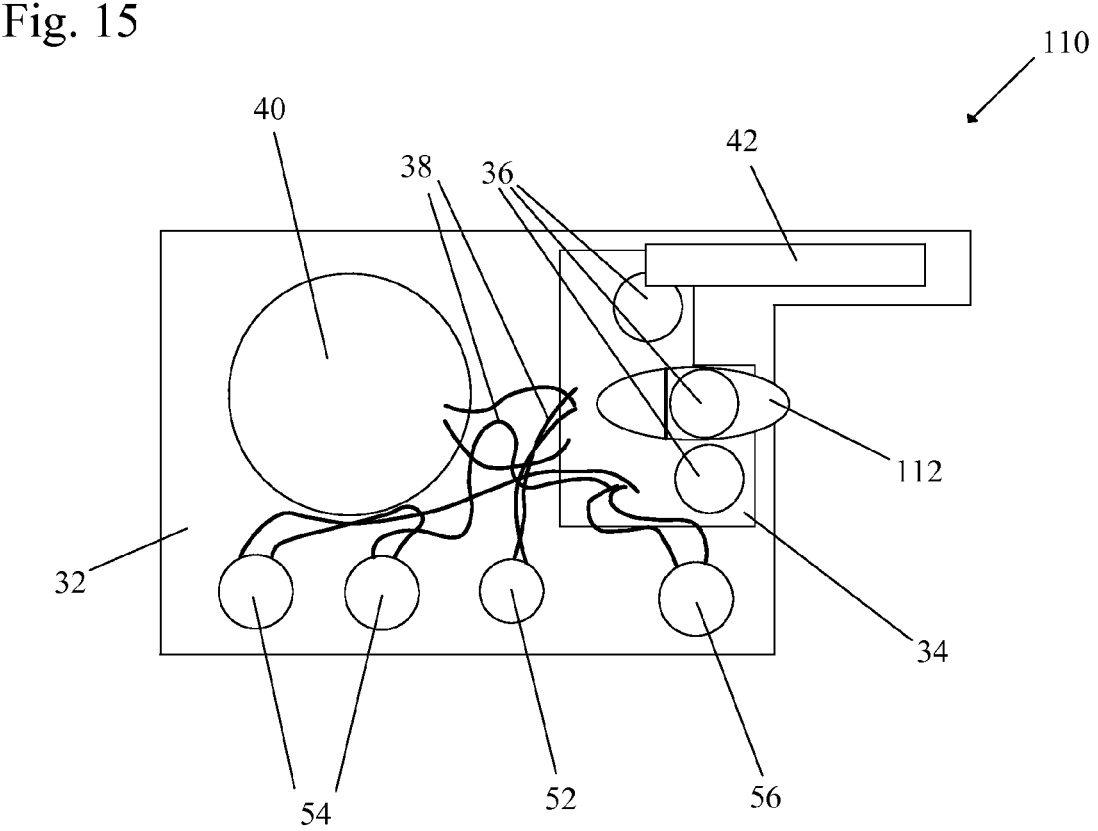
FIG. 15 shows schematically shows a recordable pizza box audio module in an embodiment of the present invention.

FIG. 15 shows a pizza box audio module 110 that is similar in design to the audio module 50 of FIG. 5. This audio module 110, however, differs in that the module 110 is only recordable and re-recordable with the key 112 in a first position, as shown in FIG. 15. When the key 112 is pulled out to a second position, audio can no longer be recorded or re-recorded on the audio module 110. In some embodiments, the key 112 has a first part made of an electrically conductive material, such as a metal, and a second part made of a non-conductive material, such as a plastic. When the first part is located under the battery, the record buttons 54 and replay button 56 allow a user to record audio, re-record audio, and replay the recorded audio. When the user is finished recording, the user may pull the key 112 such that the non-conductive part is located under the battery. The audio module 110 is then no longer recordable and only plays the last-recorded audio. This design allows the audio module to be mounted to the pizza box prior to being sent to the pizza restaurant, such as at the manufacture location of the pizza box, while still allowing the pizza shop to record customized audio for the musical pizza box that the customer can not erase or record over.

Although the pizza box is preferably made of corrugated cardboard, the pizza box may be made of any material appropriate for containing and transporting a pizza. The pizza box material is preferably inexpensive and relatively lightweight, but sturdy enough to support the weight of a pizza and able to provide sufficient insulation to the pizza to keep the pizza warm during the transport time. In some embodiments, the pizza box material has a thickness greater than a thickness of the pizza box audio module. In other embodiments, however, the pizza box material has a thickness less than or equal to a thickness of the pizza box audio module. Although the corrugated cardboard is shown in the figures as having only a top layer, a bottom layer, and a single corrugated layer, any corrugated cardboard structure may be used within the spirit of the present invention, including, but not limited to, corrugated cardboard with multiple corrugated layers alternating with not-corrugated layers. In some embodiments, the corrugated cardboard is coated with a material to improve the water resistance or thermal insulation of the pizza box.

The pizza box may have any dimensions appropriate for receiving and holding a pizza or part of a pizza. In one embodiment, the pizza box has a width and a depth of about 16 inches and a height of about two inches. Although the pizza box is shown as being rectangular in shape, a pizza box may have any shape appropriate for receiving and holding a pizza or part of a pizza, such as, for example, octagonal or triangular. Although the pizza box is shown with the lid being hingedly connected to the base, a pizza box may have a removable lid within the spirit of the present invention. In such embodiments, the pizza box music module is preferably light-activated.

While the invention has been described with respect to pizza boxes, the present invention may alternatively be used on other boxes, including, but not limited to, candy boxes, cereal boxes, and snack boxes.

Accordingly, it is to be understood that the embodiments of the invention herein described are merely illustrative of the application of the principles of the invention.

Reference herein to details of the illustrated embodiments is not intended to limit the scope of the claims, which themselves recite those features regarded as essential to the invention.

What is claimed is:

1. A musical pizza box comprising:
   a box material, comprising corrugated cardboard comprising a top layer, a bottom layer, and at least one corrugated layer between the top layer and the bottom layer, the box material being folded into a pizza box comprising:
a base;
a front wall extending from the front of the base;
a pair of side walls extending from the sides of the base;
a back wall extending from the back of the base;
a lid hingedly extending from the top of the back wall; and
a front flap extending from the front of the lid and insertable behind the front wall with the pizza box in a closed state;
wherein the pizza box is sized to receive a pizza; and
a pizza box audio module comprising:
a speaker;
a microchip board;
a microchip mounted on the microchip board for storing a recorded audio message;
at least one power source;
electrical wiring electrically connecting the speaker, the microchip board, and the power source; and
an activation mechanism;
wherein the pizza box audio module is mounted in a pocket formed in the corrugated layer by removal of a portion of the corrugated layer such that when the lid is moved from the closed state to an opened state, the activation mechanism is triggered to cause any recorded audio message stored on the microchip to be emitted by the speaker.

2. The musical pizza box of claim 1, wherein the activation mechanism comprises a tab mechanically coupled to the pizza box to extend or retract when the lid is moved from the closed state to the opened state.

3. The musical pizza box of claim 2, wherein the pizza box audio module is coupled to the back wall of the pizza box and the tab is attached to the lid or the base of the pizza box.

4. The musical pizza box of claim 2, wherein the pizza box audio module is coupled to the lid or the base of the pizza box and the tab is attached to the back wall of the pizza box.

5. The musical pizza box of claim 1, wherein the activation mechanism comprises a light sensor.

6. The musical pizza box of claim 5, wherein the pizza box audio module is coupled to the box material such that the light sensor is exposed and facing the inside of the pizza box when the pizza box is in the closed state.

7. The musical pizza box of claim 1, wherein the pizza box audio module further comprises a microphone, and at least one record button, wherein the electrical wiring further electrically connects the microphone and the record button to the microchip such that, when the record button is pressed, any audio received by the microphone is recorded as the recorded audio message on the microchip.

8. The musical pizza box of claim 1, wherein the recorded audio message is prerecorded on the microchip.

9. The musical pizza box of claim 1, wherein:
the microchip board comprises a mounting location and the microchip is a microchip module receivable in the mounting location; and
the pizza box audio module is coupled to the box material such that the microchip module is insertable in the mounting location after the pizza box audio module is coupled to the box material.

10. The musical pizza box of claim 1, wherein the musical pizza box has a width of about 16 inches, a depth of about 16 inches, and a height of about 2 inches.

11. The musical pizza box of claim 8, wherein the recorded audio message is an advertisement.

12. A musical pizza box comprising:
a box material, comprising corrugated cardboard comprising a top layer, a bottom layer, and at least one corrugated layer between the top layer and the bottom layer, the box material being folded into a pizza box comprising:
a base;
a front wall extending from the front of the base;
a pair of side walls extending from the sides of the base;
a back wall extending from the back of the base;
a lid hingedly extending from the top of the back wall; and
a front flap extending from the front of the lid and insertable behind the front wall with the pizza box in a closed state;
wherein the pizza box is sized to receive a pizza; and
a pizza box audio module comprising:
a speaker;
a microchip board;
a microchip mounted on the microchip board for storing a recorded audio message;
at least one power source;
electrical wiring electrically connecting the speaker, the microchip board, and the power source; and
an activation mechanism;
wherein the pizza box audio module is mounted in a recess formed in the corrugated layer by removal of a portion of the top layer and a portion of the corrugated layer such that when the lid is moved from the closed state to an opened state, the activation mechanism is triggered to cause any recorded audio message stored on the microchip to be emitted by the speaker.

13. The musical pizza box of claim 12, wherein the activation mechanism comprises a tab mechanically coupled to the pizza box to extend or retract when the lid is moved from the closed state to the opened state.

14. The musical pizza box of claim 13, wherein the pizza box audio module is coupled to the back wall of the pizza box and the tab is attached to the lid or the base of the pizza box.

15. The musical pizza box of claim 13, wherein the pizza box audio module is coupled to the lid or the base of the pizza box and the tab is attached to the back wall of the pizza box.

16. The musical pizza box of claim 12, wherein the pizza box audio module further comprises a microphone, and at least one record button, wherein the electrical wiring further electrically connects the microphone and the record button to the microchip such that, when the record button is pressed, any audio received by the microphone is recorded as the recorded audio message on the microchip.

17. The musical pizza box of claim 12, wherein the recorded audio message is prerecorded on the microchip.

18. A musical pizza box comprising:
a box material folded into a pizza box comprising:
a base;
a front wall extending from the front of the base;
a pair of side walls extending from the sides of the base;
a back wall extending from the back of the base;
a lid hingedly extending from the top of the back wall; and
a front flap extending from the front of the lid and insertable behind the front wall with the pizza box in a closed state;
wherein the pizza box is sized to receive a pizza; and
a pizza box audio module comprising:
a pizza box audio module body comprising:
a speaker;
a microchip board;

a microchip mounted on the microchip board for storing a recorded audio message;
at least one power source; and
electrical wiring electrically connecting the speaker, the microchip board, and the power source; and
a tab mechanically coupled to the pizza box audio module body, wherein pulling the tab causes any recorded audio message stored on the microchip to be emitted by the speaker;
wherein the pizza box audio module is coupled to the base and the back wall of the pizza box such that when the lid is moved from the closed state to an opened state, the tab is pulled to cause the recorded audio message stored on the microchip to be emitted by the speaker.

19. The musical pizza box of claim 18, wherein the pizza box audio module body is coupled to the back wall of the pizza box and the tab is attached to the base of the pizza box.

20. The musical pizza box of claim 18, wherein the pizza box audio module body is coupled to the base of the pizza box and the tab is attached to the back wall of the pizza box.

* * * * *

UNITED STATES PATENT AND TRADEMARK OFFICE
CERTIFICATE OF CORRECTION

PATENT NO.         : 8,720,690 B2
APPLICATION NO.    : 13/772823
DATED              : May 13, 2014
INVENTOR(S)        : Gaetano Francesco Ruggiero It is certified that error appears in the above-identified patent and that said Letters Patent is hereby corrected as shown below:

In the Claims:

Claim 1 (Column 7, line 4): replace "a base:" with "a base;"

Signed and Sealed this
Eighth Day of July, 2014

Michelle K. Lee
*Deputy Director of the United States Patent and Trademark Office*